(12) United States Patent
Pedersen

(10) Patent No.: US 6,554,573 B1
(45) Date of Patent: Apr. 29, 2003

(54) ROTOR

(75) Inventor: Rikard Pedersen, Laholm (SE)

(73) Assignee: Vind-Och Vattenturbiner, Laholm (SE)

( * ) Notice: Subject to any disclaimer, the term of this patent is extended or adjusted under 35 U.S.C. 154(b) by 0 days.

(21) Appl. No.: 09/936,200

(22) PCT Filed: Mar. 9, 2000

(86) PCT No.: PCT/SE00/00465
§ 371 (c)(1),
(2), (4) Date: Sep. 10, 2001

(87) PCT Pub. No.: WO00/53923
PCT Pub. Date: Sep. 14, 2000

(30) Foreign Application Priority Data

Mar. 10, 1999 (SE) .................................. 9900847

(51) Int. Cl.[7] ............................. F03D 1/06; F03D 7/02; F03B 3/06; F03B 3/14
(52) U.S. Cl. ................... 416/117; 416/136; 416/137; 416/202; 416/243
(58) Field of Search ................. 416/137, 136, 416/197 A, 117, 243, 202

(56) References Cited

U.S. PATENT DOCUMENTS

| | | | | |
|---|---|---|---|---|
| 114,381 A | * | 5/1871 | Woodruff | 416/137 |
| 797,197 A | * | 6/1905 | Gran | 416/137 |
| 857,376 A | * | 6/1907 | Axelstrom | 416/137 |
| 2,054,383 A | * | 9/1936 | Ludewig | 416/202 |
| 4,116,585 A | * | 9/1978 | Maracic | 416/202 |

FOREIGN PATENT DOCUMENTS

| | | | | |
|---|---|---|---|---|
| DE | 19522125 | 1/1997 | | |
| EP | 0391704 | 10/1990 | | |
| EP | 0965753 | 12/1999 | | |
| GB | 2041458 A | * | 9/1980 | 416/197 A |
| SE | 95503657 | 4/1997 | | |

\* cited by examiner

Primary Examiner—Christopher Verdier
(74) Attorney, Agent, or Firm—Banner & Witcoff, Ltd.

(57) ABSTRACT

A rotor is intended to rotate in a fluid flowing in a flow direction and comprises a plurality of rotor blades, at the most four blades, which are arranged to rotate about an axis of rotation. Each blade forms a single-curved surface, the generatrix of which extends in a plane normal to the axis of rotation, and an imaginary plane interconnecting the leading edge and trailing edge of the blade forms an acute angle with the axis of rotation. In addition, each blade is pivotally mounted for pivotal movement about a pivot shaft in order to adjust the acute angle, the pivot shaft extends in a plane that is normal to the axis of rotation and is parallel to and spaced a distance from an imaginary radius radiating from the axis of rotation. The rotor is very silent and provides efficient energy conversion, for example extraction of wind power.

9 Claims, 5 Drawing Sheets

ROTOR

This is a U.S. National Phase Application Under 35 USC 371 and applicant herewith claims the benefit of priority of PCT/SE00/00465 filed Mar. 9, 2000, which was published under PCT Article 21(2) in English, and Application No. 9900847-6 filed on Mar. 10, 1999 in Sweden.

TECHNICAL FIELD

The present invention relates to a multi-blade rotor designed to be used for energy conversion. The rotor could, for example, be used to extract rotional energy from a fluid flow, or, conversely, to produce a fluid flow from rotational energy.

It is particularly advantageous to connect the rotor to a generator and to extract energy from wind or water power.

TECHNICAL BACKGROUND

Numerous rotors of the above kind are already known. Particularly common are different kinds of propellers having several propeller blades disposed on a shaft. In such propellers, each propeller blade forms an elongate surface, which extends essentially radially from the shaft and which is bent in its longitudinal direction.

Prior-art rotors do, however, suffer from several drawbacks, the most serious ones of which will be discussed in the following.

Firstly, the efficiency of traditional rotors is comparatively low. In the case of wind power, experts speak in terms of actual efficiency from a wind exposed area of one square meter of less than 1 Watt per m/s. A propeller having an exposed area of one square meter (a radius of about 60 cm), thus could extract about 10 Watt when the wind force amounts to 10 m/s.

Secondly, considerable forces are created axially, when prior-art rotors are exposed to the effects of a flowing fluid. In wind power stations, experts reckon that the supporting structure must be dimensioned to withstand twice the force that the rotor is capable of converting into energy.

Another problem found in prior-art rotors is that they generate a high-pitch sound that some individuals experience as an unpleasant noise.

OBJECT OF THE INVENTION

A first object of the present invention is to provide efficient extraction of energy, such as wind power.

A second object of the invention is to provide a rotor that is inexpensive and simple to manufacture.

A third object of the invention is to provide a rotor that is relatively noiseless in operation.

SUMMARY OF THE INVENTION

These objects are achieved by means of a rotor of the kind outlined above.

In order to deflect the flow as desired, the rotor comprises several blades, each one of which consists of a single-curved surface, the leading edge of which extends essentially radially from the axis of rotation and is located in a plane forming a small angle (preferably 80–100 degrees) with the axis of rotation.

Further, each blade is mounted on a shaft, which extends in a plane normal to the axis of rotation and which is parallel to and spaced a distance from an imaginary radius extending outwards from the axis of rotation.

Each blade could form an essentially rectangular surface the curvature of which is such that the plane projection of the blade, i.e. the extension of the blade to the flow, forms an essentially square surface.

With rotor blades thus shaped the entire flow is deflected in a plane normal to the axis of rotation as seen in the extension of the blade. Since the leading edge projects essentially radially from the axis of rotation and the flow, after its deflection, is directed at right angles to the leading edge, the flow with respect to each blade occupies a 90° sector area around the axis of rotation. If the number of blades were to exceed four, the deflected flow would be brought into contact with an adjacent blade, and consequently would brake the rotor. For this reason, the rotor in accordance with the invention comprises a maximum of four rotor blades.

In prior-art rotors the pivot shaft of each rotor blade, i.e. the shaft upon which each blade pivots, is arranged radially outwards from the axis of rotation, the leading rotor-blade edge being parallel to and spaced a distance from an imaginary radius. In accordance with the teachings of the present invention, the arrangement is exactly the opposite, i.e. it is instead the leading edge that is arranged to extend radially outwards from the axis of rotation and the pivot shaft that is parallel to and spaced from an imaginary radius. It is precisely this solution that generates the particular flow pattern that is described in the subject document.

Each blade could form an essentially rectangular surface, the curvature of which is the reason why the plane projection of the blade, viz the extension/expanse that the blade presents towards the flow, forms an essentially square surface.

When a rotor in accordance with the invention is used to extract energy from a flow, such as an air flow, the rotor is arranged such that the flow streams in an axial direction and hits the leading edge of the blade first. Each blade thus is effective in forcing the flow to change its direction of movement, from essentially in parallel with the axis of rotation to a plane normal to the axis of rotation, essentially tangentially thereto. This redirection of the flow generates a force tangentially that gives rise to a torque force around the axis of rotation. A number of blades are arranged to cooperate, for which reason the entire rotor, when affected by a fluid flow, is caused to rotate.

In addition, the flow that moves past the trailing edge of each blade, attains comparatively high flow velocities, thus creating an ejector effect that brings along essentially stagnant fluid from the leeward side of the blade. In consequence, some negative pressure is generated behind the blade, which further increases the torque.

Since the entire flow is caused to change its direction, practically no air is allowed to pass through the rotor and behind the rotor, a wake is formed, which continuously is replenished with surrounding fluid.

In tests carried out under secrecy with a prototype of the inventive rotor in a wind stream, supply of smoke revealed a flow pattern approximately configured as shown in FIG. 1.

The structure and orientation of the blades and the flow image that they produce give remarkable power-extraction results. The test referred to above was carried out with an inventive prototype having a wind-receiving area of about one square meter, in environments where the wind force amounted to about 10 m/s. The effective power that could be extracted amounted to about 200 Watt, at a rotational speed of 140 rpm. The power thus obtained was highly surprising.

Furthermore, it was found that the rotor essentially obtains its full capacity immediately after start-up. The power that it is possible to extract thus is independent of the rotational speed.

The angle between an imaginary plane interconnecting the leading and trailing edges of the blade and the axis of rotation advantageously is in the range of 30–50°, and preferably it is about 45°.

In addition, the blades could be spring loaded for rotation about the pivot shaft for automatic adaptation to the flow velocity.

BRIEF DESCRIPTION OF THE DRAWINGS

The present invention will be described in more detail in the following with reference to the appended drawings which illustrate preferred embodiments of the invention for exemplifying purposes. In the drawings.

DESCRIPTION OF THE PREFERRED EMBODIMENTS

Figure 2:
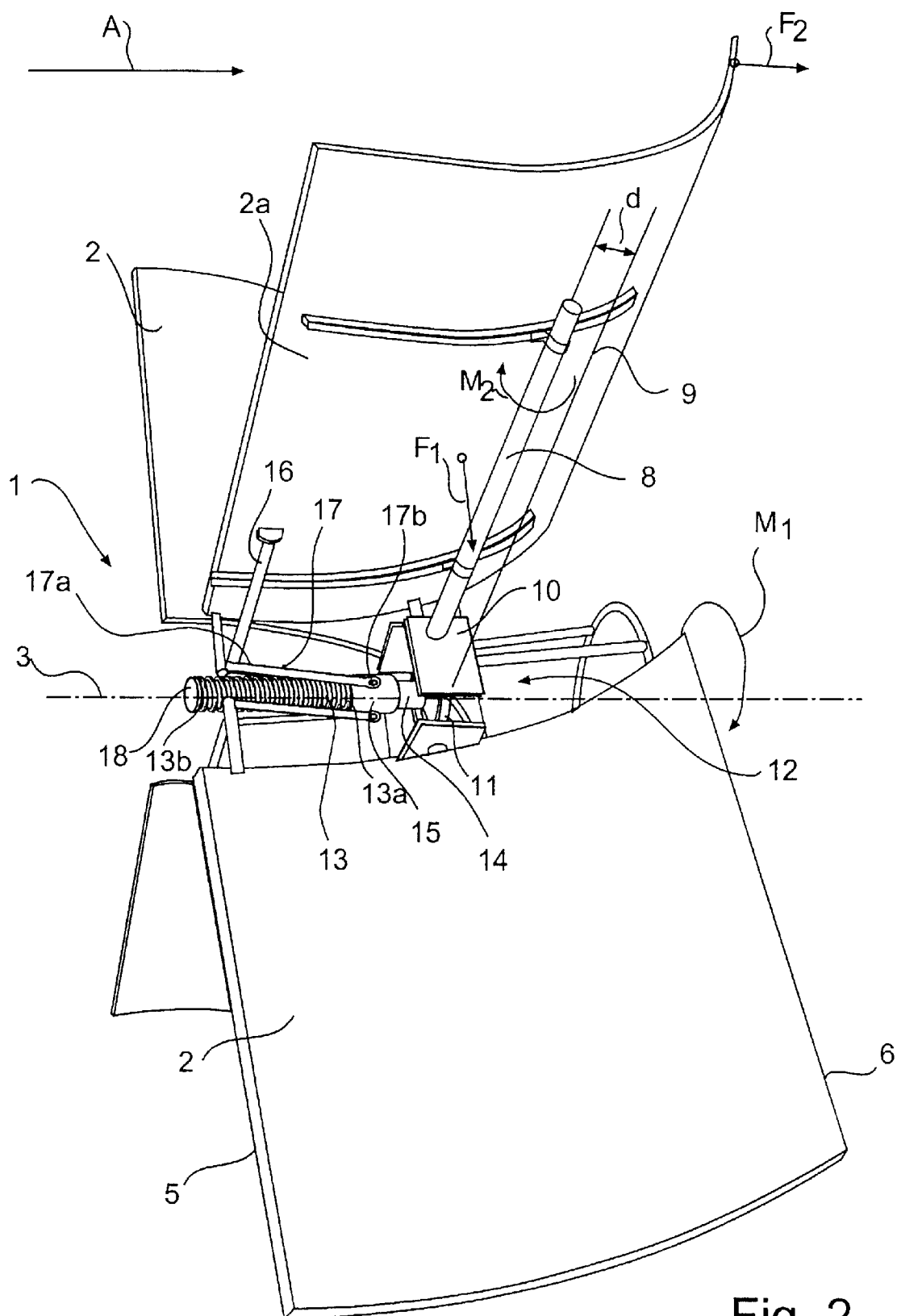
FIG. 2 is perspective view of a rotor in accordance with one embodiment of the invention.

The rotor 1 shown in FIG. 2 comprises a plurality of blades 2, in the present case four blades, which are arranged to rotate about an axis of rotation 3. The rotor 1 is intended to rotate in a fluid flowing past the rotor in flow direction A.

In accordance with the shown embodiment, each blade 2 is formed as a single-curved surface, the generatrix of which, i.e. the straight line that generates the surface, extends in a plane that is normal to the axis of rotation. The curvature of the blade 2 appears more clearly from FIG. 3 and will be discussed in more detail further on. The blade 2 has a leading edge 5 which is turned towards the flow direction A of the fluid, i.e. it is the part of the blade on which the fluid flowing towards the rotor 1 impinges first. The blade also is formed with a trailing edge 6, which thus is positioned downstream from the leading edge 5.

An imaginary plane 7 interconnecting the leading edge 5 and the trailing edge 6 forms an acute angle α with the axis of rotation 3. This angle could for example be in the range 30–50°, and preferably it is about 45°.

The blade in accordance with this embodiment is rectangular and of almost square configuration. This configuration has proved to be advantageous but should not be regarded to restrict the invention.

Each blade 2 is mounted for rotation on a pivot shaft 8, which extends in a plane that is normal to the axis of rotation and which is located somewhere between the leading and trailing blade edges.

The pivot shaft 8 extends essentially radially away from the axis of rotation 3, and preferably it is parallel to and spaced a distance d from an imaginary radius 9 radiating from the axis of rotation.

The pivot shaft preferably is positioned on the leeway side 2a of the blade 2, i.e. the side that faces away from the flow direction.

In the shown embodiment the four pivot shafts 8 are mounted in four sheet-metal plates 10 disposed symmetrically about the axis of rotation 3. The plates may be attached, for instance by welding, to a tubular body or a ring body 11 but alternatively they could be interconnected. The ring body 11 and the plates 10 together form a hub structure 12.

Preferably, the blades 2 are spring-loaded for rotation about their respective pivot shaft 8. The springiness could be achieved for example as in accordance with the shown embodiment, wherein a spring element, such as a helical compression spring 13, is placed in concentric relationship with the axis of rotation 3 upstream from the hub structure 12. The helical spring 13 could be positioned about a rod 14, which extends over some distance upstream and which is fixedly secured to the hub structure 12.

At one end 13a of the helical spring 13 an annular runner 15 is disposed about the rod 14 so as to be displaceable thereon against the spring action of the helical spring 13. The opposite end 13b of the helical spring 13 is fixed relative to the rod 14, for example by being fixedly attached to said rod, or with the aid of a block 18, which serves as a stop face against which the helical spring 13 abuts.

According to the shown embodiment a stay 16 is fixedly mounted in parallel with the leading edge 5 of each blade and so as to extend some distance inwards towards the axis of rotation 3. One end 17a of a link 17 is pivotally mounted on the end of the stay 16 closest to the axis of rotation whereas the opposite link end 17b is pivotally mounted on the runner 15.

Figure 3:
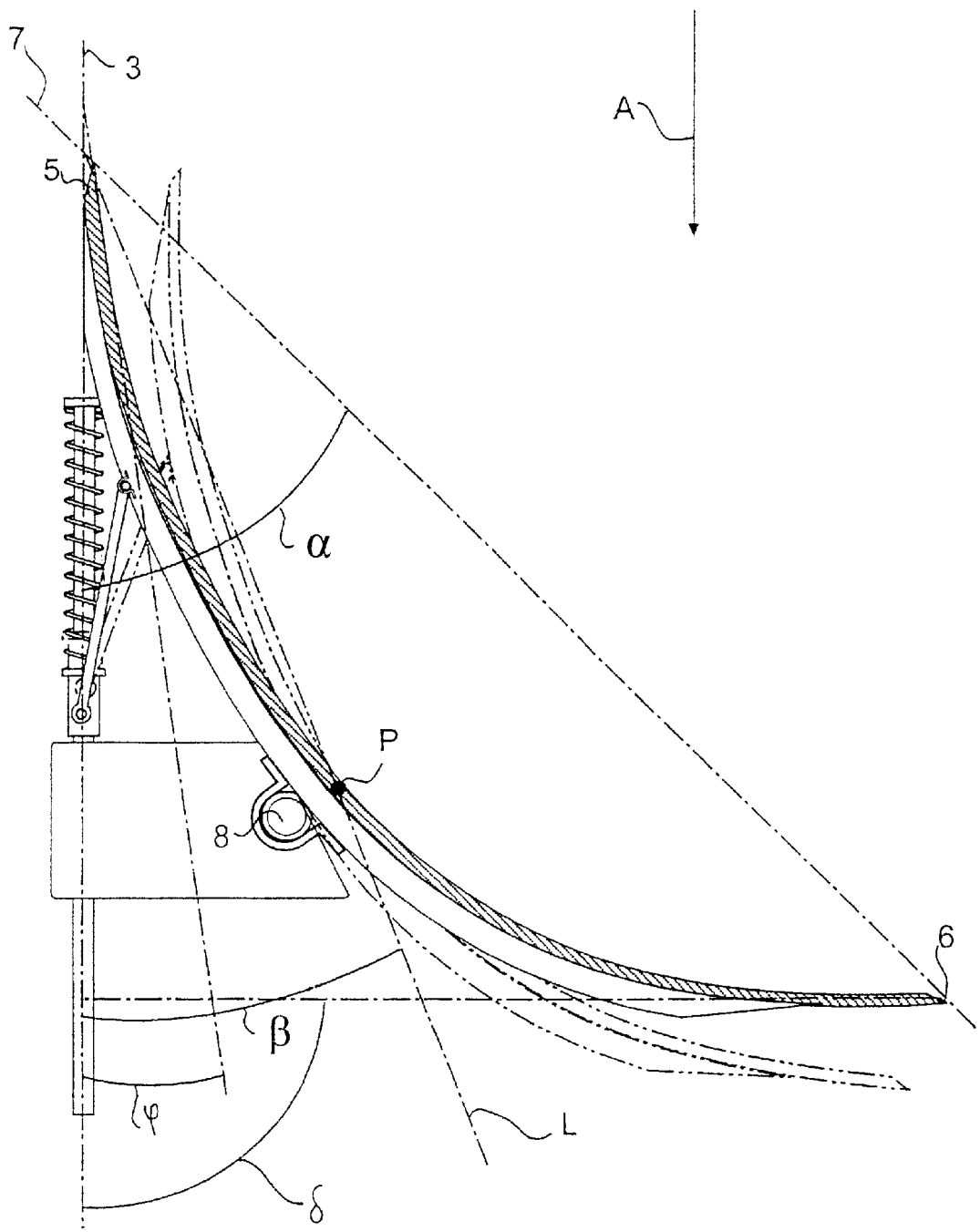
FIG. 3 schematically shows the function of the adjusting device of the rotor of FIG. 2.

FIG. 3 shows in more detail the curvature configuration of the surface of the blade 2 in accordance with this embodiment. An imaginary line L extending between the leading edge 5 and a point P positioned oppositely the pivot shaft 8 on the blade 2 forms an angle β of 20° with the axis of rotation 3. The curvature of the blade continues such that an imaginary line interconnecting the leading edge 5 of the blade and the trailing edge thereof forms an angle α of about 45° with the axis of rotation. At the leading edge 5, the blade forms an angle φ with the flow direction A and the axis of rotation 3, said angle φ ranging between 0 and 10°, whereas at the trailing edge 6, the blade 2 forms an angle δ with the flow direction A and the axis of rotation 3, said angle δ ranging between 80 and 100°.

The function of the rotor will be described in the following based on the use of the rotor to extract energy from a passing stream of a fluid, such as air. In cases when the function is the reverse one, i.e. when the rotor converts rotational energy into a fluid flow, the description below must be adapted accordingly. To do so is within the capacity of the expert.

When the flowing fluid impinges on the leading edges 5 of the blades 2, the flow follows the curvature of the blades and consequently it is deflected. The deflection, which is a lateral acceleration, generates a centrifugal force that affects the blades 2 in a peripheral direction relative to the axis of rotation 3, whereby a torque force $M_1$ arises. The blades 2 are arranged in the rotor in such a manner that the blade-induced torque forces cooperate and thus turn the rotor 1 and also drive any equipment connected thereto for energy-extraction purposes.

Since the pivot shaft 8 is positioned on the leeway side of the blade 2, the windward side of the blade, i.e. the side turned towards the fluid flow, is completely smooth, which results in an even flow.

When the flow passes the trailing edge 6 of the blade, the flow direction has changed and is now directed away from the axis of rotation 3 rather than being directed in parallel with that axis. In the shown embodiment, the flow direction at the trailing edge of the blade 2 is essentially perpendicular outwards from the axis of rotation, and thus extends in a plane normal to the axis of rotation 3.

Figure 1:
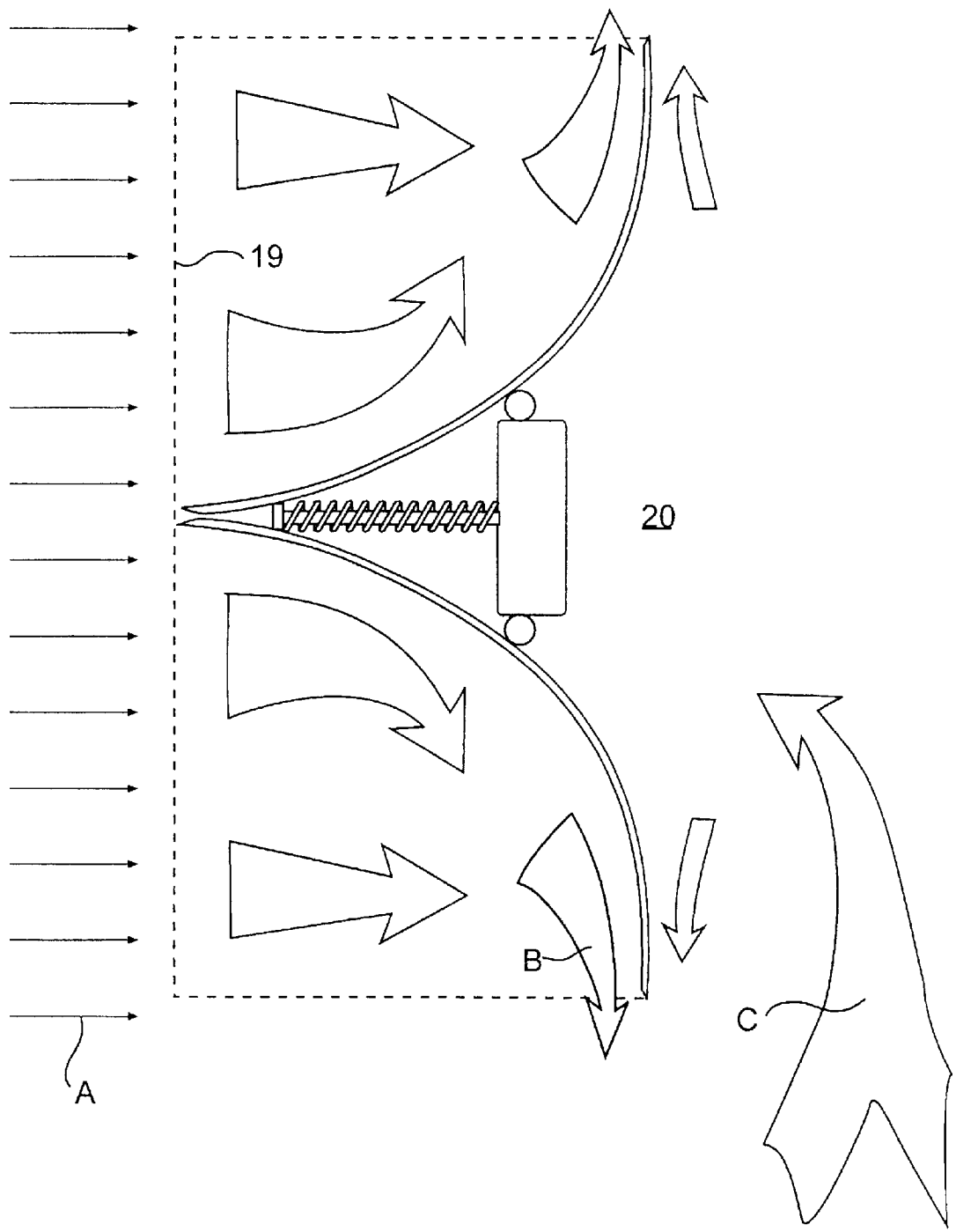
FIG. 1 schematically shows the flow past a rotor in accordance with one embodiment of the invention.

Because of the even curvature of the blade, the velocity of the fluid flow is not reduced but on the contrary, it increases, since all fluid flowing towards the blade reception area, which consists of a plane projection 19 of the blade in the cross-flow direction, is forced to pass the trailing edge 6 (see FIG. 1). Consequently, correct adaptation of the curvature of the blade is of essence, so that suitable relations are achieved between the reception area, the curvature, and the length of the blade. The curvature of the blade together with the length of the blade determine the angle $\alpha$.

The fluid thus is forced to pass the trailing edge 6 at a velocity that is higher than the original flow velocity. This creates an ejector effect, whereby the fluid on the leeside is brought along by the fluid flow B that streams past the trailing edge 6. This ejector effect creates a certain negative pressure on the leeside of the blade 2, which further strengthens the torque $M_1$ of the rotor.

Because essentially all fluid flow in the direction along the axis of rotation 3 is deflected and instead is made to flow in a direction away from the axis of rotation, an area that is comparatively current-free generates downstream from the rotor, i.e. a wake 20. With careful configuration of the blades 2, a situation of essentially complete calm may prevail in this wake 20. A fluid flow C directed towards the wake thus is created, as shown in FIG. 1.

In addition to being affected by the peripheral force $F_1$ giving rise to the torque $M_1$, every blade is also affected by a force $F_2$ that causes the generation of a torque force $M_2$, the latter force tending to pivot the blade about the pivot shaft 8. This pivotal movement is prevented by the stay 16, which is immobilized by the runner 15, via the link 17. When the flow velocity is sufficiently high the torque force $M_2$ does, however, become so powerful that the runner is displaced along the rod 14 against the action of the helical spring 13.

The pivotal movement that the blade thus is made to perform results in a reduction of the fluid-flow deflection, since the reception area of the blade becomes smaller. In addition, some fluid may now flow in between the leading edges of the blades, close to the axis of rotation 3, and to the leeside of the blade, which destroys the negative pressure previously prevailing on this side. Together this leads to a reduction of the torque forces $M_1$ and $M_2$. The angular position of the blade 2 thus becomes self-adjusting, such that the angle $\alpha$ assumes such a value that the torque force $M_2$ balances the spring action of the compression spring 13. A suitable choice of the spring element thus produces the desired adjustment of the torque $M_1$ of the rotor.

Figure 4A:
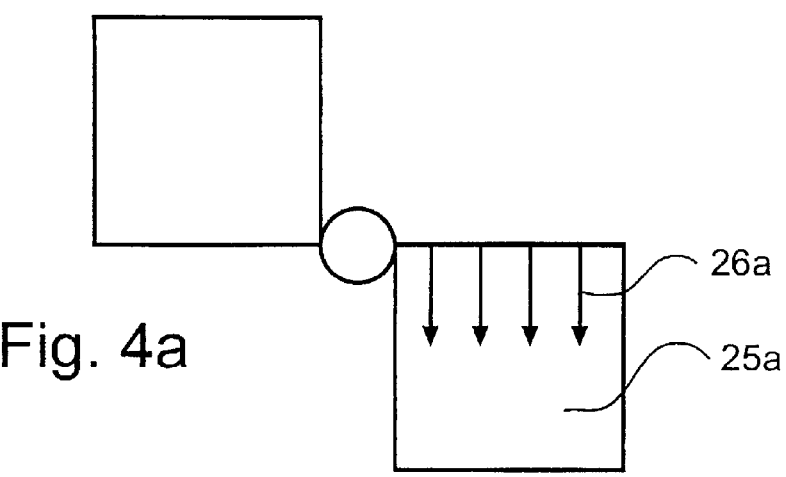
FIGS. 4a–c schematically show rotor configurations according to the invention, involving different numbers of rotor blades.
Figure 4B:
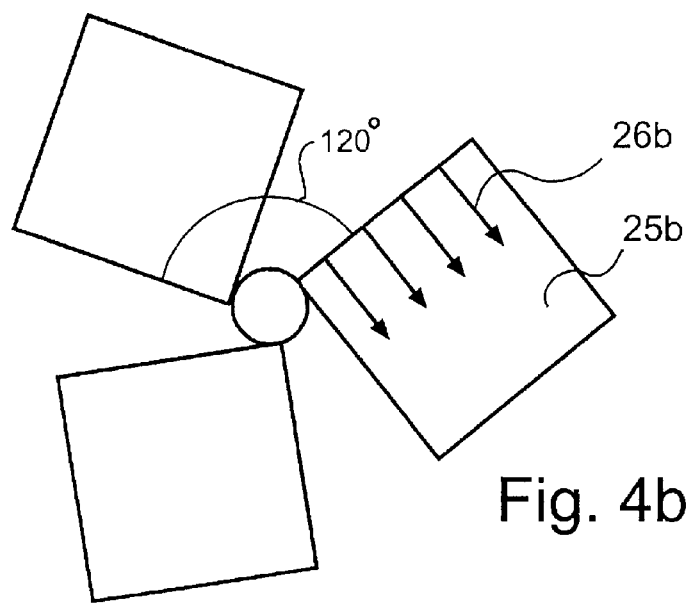
Figure 4C:
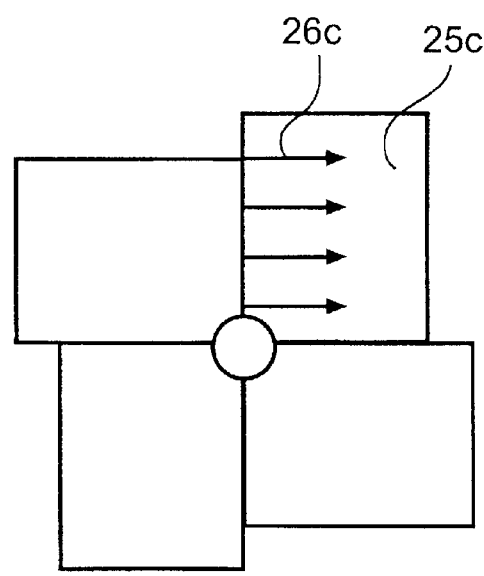

The rotor in accordance with the invention causes the entire flow to be deflected in a plane normal to the axis of rotation, in a tangential direction. Since the leading edge of each rotor blade projects essentially radially from the axis of rotation, flow patterns as shown in FIGS. 4a–c are created, which drawing figures schematically show various different rotor configurations in accordance with the invention. The extension of each rotor blade towards the flow is designated 25a–c, whereas the arrows indicating the flow direction are designated 26a–c.

FIG. 4a shows a configuration comprising two rotor blades 25a. The flow 26a along these rotor blades moves away from the rotor in opposite directions in a plane normal to the axis of rotation. In FIG. 4b three rotor blades 25b are indicated, and in this case the flow 26b moves away from the rotor in three different directions, spaced 120° apart. FIG. 4c, finally, corresponds to the rotor configuration described above and comprising four rotor blades 25c. The flow 26c in this case moves away from the rotor in four different directions.

It is worth noting that the flows in FIGS. 4a–c represent momentary situations. In operation, the flow directions 26a–c obviously vary with the rotation of the rotor, which results in a principally continuous flow away from the axis of rotation in all directions.

As will be appreciated, a large number of modifications of the above embodiments are possible within the scope of the appended claims. The inventive idea does, however, embrace all rotors that create deflection of a fluid flow in the manner taught herein by means of single-curved blades.

Figure 5:
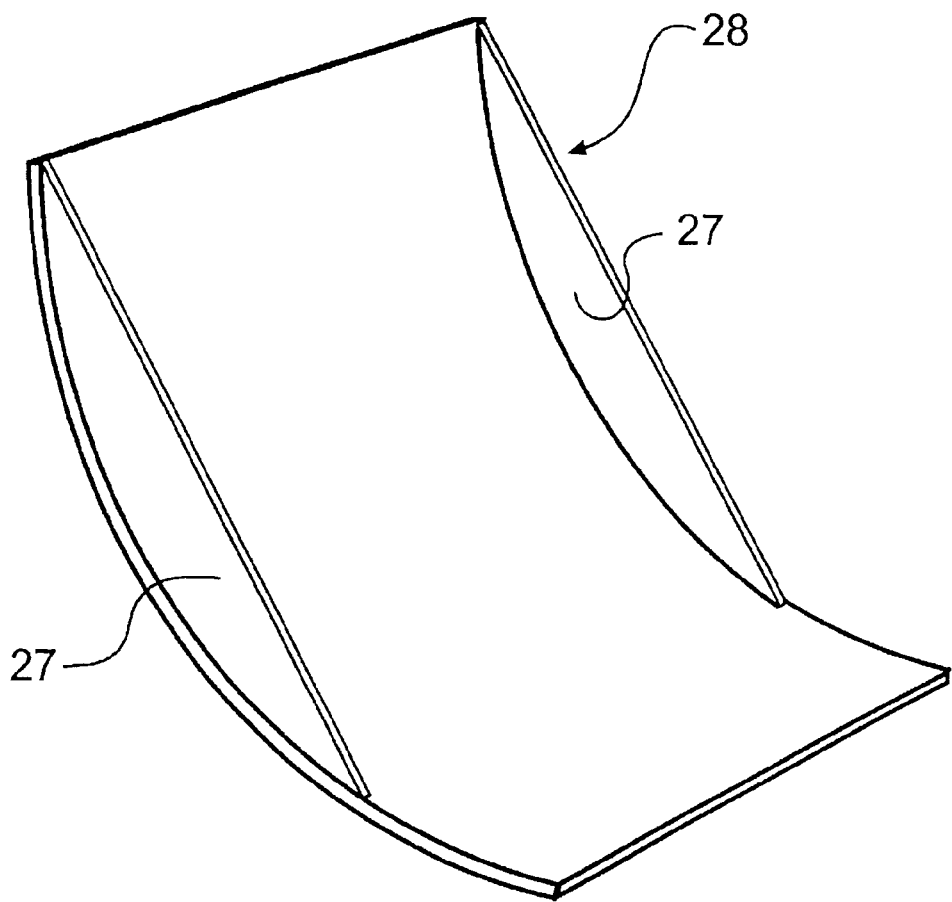
FIG. 5 schematically shows a rotor blade in accordance with one embodiment of the invention.

One example of an alternative and preferred embodiment of a rotor blade in accordance with the invention is shown in FIG. 5, which embodiment comprises covering elements 27 in the form of plates located at the sides of the rotor blades, such that a bucket-shaped structure 28 is formed. The covering elements force an even larger part of the fluid flow to move past the trailing edge of the blade, thus increasing the rotor efficiency by 20 percent or more. In the shown example, the rotor blade itself extends somewhat past the covering plates 27 but this feature should not be regarded as a limiting one.

What is claimed is:

1. A rotor intended to rotate in a fluid flowing in a flow direction and comprising at least two and at the most four rotor blades, which are arranged to rotate about an axis of rotation, wherein each blade forms a single-curved surface, the generatrix of which extends in a plane normal to the axis of rotation, each blade having a leading edge, which is turned towards the flow direction and which extends essentially radially away from and normal to the axis of rotation and in a plane forming an inlet angle in the range of 0–10° relative to the axis of rotation, and a trailing edge located downstream from the leading edge and extending in a plane, which forms an outlet angle in the range of 80–100° relative to the axis of rotation, an imaginary plane interconnecting said leading and trailing edges forming an acute angle with the axis of rotation, and each blade is pivotally mounted for pivotal movement about a pivot shaft in order to adjust the acute angle, said pivot shaft extending in a plane that is normal to the axis of rotation and being parallel to and spaced a distance from an imaginary radius radiating from the axis of rotation.

2. A rotor as claimed in claim 1, wherein the acute angle is in the range of 30–50°.

3. A rotor as claimed in claim 1, wherein the blades are spring-loaded for rotation about the pivot shaft to automatically adjust the acute angle to the flow velocity.

4. A rotor as claimed in claim 1 comprising four blades (2).

5. A rotor as claimed in claim 1, wherein a perimeter of each blade is defined by an essentially rectangular border.

6. A rotor as claimed in claim 1, wherein the rotor is used to extract wind power.

7. A rotor as claimed in claim 1, wherein the rotor is used to extract water power.

8. A rotor as claimed in claim 2, wherein the blades are spring-loaded for rotation about the pivot shaft to automatically adjust the acute angle to the flow velocity.

9. A rotor as claimed in claim 1, wherein the acute angle is about 45°.

* * * * *